(12) United States Patent
Cho et al.

(10) Patent No.: US 9,987,826 B2
(45) Date of Patent: Jun. 5, 2018

(54) DISPLAY DEVICE HAVING ADHESION LAYER BETWEEN CURVED WINDOW PANEL AND CURVED DISPLAY PANEL

(71) Applicant: Samsung Display Co., Ltd., Yongin-si, Gyeonggi-do (KR)

(72) Inventors: Youngje Cho, Asan-si (KR); Min-chul Song, Suwon-si (KR); Yujin Lee, Suwon-si (KR); Yeon-mun Jeon, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 60 days.

(21) Appl. No.: 15/014,099

(22) Filed: Feb. 3, 2016

(65) Prior Publication Data

US 2016/0295715 A1 Oct. 6, 2016

(30) Foreign Application Priority Data

Apr. 3, 2015 (KR) .......................... 10-2015-0047583

(51) Int. Cl.
| | |
|---|---|
| *G02F 1/1333* | (2006.01) |
| *B32B 7/12* | (2006.01) |
| *B32B 9/04* | (2006.01) |
| *B32B 27/08* | (2006.01) |
| *B32B 1/00* | (2006.01) |
| *B32B 3/26* | (2006.01) |

(52) U.S. Cl.
CPC ................. *B32B 7/12* (2013.01); *B32B 1/00* (2013.01); *B32B 3/263* (2013.01); *B32B 9/045* (2013.01); *B32B 27/08* (2013.01); *G02F 1/1333* (2013.01); *B32B 2255/00* (2013.01); *B32B 2307/40* (2013.01); *B32B 2457/20* (2013.01); *B32B 2457/202* (2013.01); *G02F 2202/28* (2013.01)

(58) Field of Classification Search
CPC ..................................................... G02F 1/1333
See application file for complete search history.

(56) References Cited

U.S. PATENT DOCUMENTS

| | | | |
|---|---|---|---|
| 4,078,959 A | 3/1978 | Palfey et al. | |
| 8,576,370 B1 * | 11/2013 | Sampica | ............... G02F 1/1335 349/155 |

(Continued)

FOREIGN PATENT DOCUMENTS

| | | |
|---|---|---|
| KR | 10-1300021 B1 | 8/2013 |
| KR | 10-1319543 B1 | 10/2013 |

(Continued)

*Primary Examiner* — Edmond Lau
(74) *Attorney, Agent, or Firm* — Cantor Colburn LLP

(57) ABSTRACT

A display device includes a window panel having a first radius of curvature, a display panel and an adhesion layer. The display panel defines a first portion having a second radius of curvature, and a second portion which extends from an end of the first portion and has a third radius of curvature different from the second radius of curvature. In a line normal to the upper surface of the display panel, a first distance between a first point at the upper surface of the first portion of the display panel and a first crossing point at an upper surface of the window panel, is different from a second distance between a second point at the upper surface of the second portion of the display panel and a second crossing point at the upper surface of the window panel.

20 Claims, 5 Drawing Sheets

(56) References Cited

U.S. PATENT DOCUMENTS

2011/0205472 A1* 8/2011 Kobayashi .............. B32B 17/06
                                                      349/104
2013/0321740 A1* 12/2013 An ....................... H05K 5/0217
                                                      349/58

FOREIGN PATENT DOCUMENTS

| KR | 1020140002243 A  | 1/2014  |
| KR | 1020140140944 A1 | 12/2014 |
| KR | 1020140141142 A  | 12/2014 |

* cited by examiner

DISPLAY DEVICE HAVING ADHESION LAYER BETWEEN CURVED WINDOW PANEL AND CURVED DISPLAY PANEL

This application claims priority to Korean Patent Application No. 10-2015-0047583, filed on Apr. 3, 2015, and all the benefits accruing therefrom under 35 U.S.C. § 119, the entire contents of which are hereby incorporated by reference.

BACKGROUND (1) Field

The invention relates to a display device, and more particularly, to a display device having improved display quality.

(2) Description of the Related Art

Curved display devices having a curved display surface are widely used by customers. The curved display devices may be variously applied according to design requirements or arrangement thereof in an environment. In a curved or bent state of a curved display device, stress may be concentrated on opposing ends of a curved display panel within the curved display device to cause a portion of the display panel to be crushed or damaged. Where a portion of the display panel in a curved display device is damaged, a cell gap within the display panel may vary to cause an image to be seen too bright or dark on the curved display surface.

SUMMARY

One or more exemplary embodiment of the invention provides a display device having improved display quality.

An exemplary embodiment of the invention provides a display device including a window panel having a first radius of curvature, a display panel which displays an image, an upper surface of the display panel facing the window panel, and an adhesion layer which is disposed between the window panel and the display panel and bonds the window panel to the display panel. The display panel defines a first portion thereof at an axis about which the display panel is curved, the first portion having a second radius of curvature, and a second portion thereof which extends from a first end of the first portion and has a third radius of curvature different from the second radius of curvature. In a line normal to the upper surface of the display panel, a first distance between a first point at the upper surface of the first portion of the display panel and a first crossing point at an upper surface of the window panel, is different from a second distance between a second point at the upper surface of the second portion of the display panel and a second crossing point at the upper surface of the window panel.

The display panel may further define a third portion thereof extending from a second end of the first portion opposing the first end thereof, and the third portion may have a radius of curvature greater than the second radius of curvature of the first portion of the display panel or the third portion of the display panel may have an infinite radius of curvature such that the third portion is substantially flat.

The display panel may further define a display surface curved with respect to a plane defined by a first direction and a second direction which crosses the first direction. The second portion, the first portion, and the third portion may define the display surface and are sequentially disposed along a direction perpendicular to the first direction.

Among the display panel defining the first and second portions and the window panel having the first radius of curvature, the window panel may define a curvature center thereof and the display panel may a curvature center thereof, and in a cross-sectional direction, the display panel may be disposed between the window panel and each of the curvature centers of the window panel and the display panel.

The adhesion layer may define a first adhesion member thereof attached to the first portion of the display panel; and a second adhesion member thereof attached to the second portion of the display panel. A minimum thickness of the second adhesion member may be equal to or greater than a maximum thickness of the first adhesion member. The second distance may be greater than the first distance.

A thickness of the second adhesion member attached to the second portion of the display panel may increase from the first end of the first portion of the display panel to a distal end of the second portion of the display panel.

A thickness of the first adhesion member attached to the first portion of the display panel may be substantially uniform.

A thickness of the first adhesion member attached to the first portion of the display panel may increase from a center portion thereof to the second adhesion member.

In a plan view, the adhesion layer may be attached to the first portion of the display panel to extend to overlap the first portion and terminate at the second portion of the display panel.

A thickness of the adhesion layer which overlaps the first portion of the display panel and terminates at the second portion of the display panel may be substantially uniform.

A thickness of the adhesion layer which overlaps the first portion of the display panel and terminates at the second portion of the display panel may increase from a center of the adhesion layer to a terminating end thereof.

The third radius of curvature of the second portion of the display panel may be greater than the second radius of curvature of the first portion of the display panel.

The third radius of curvature of the second portion of the display panel may be infinite such that the second portion is substantially flat.

The second radius of curvature of the first portion of the display panel may be equal to or less than the first radius of curvature of the window panel.

The adhesion layer may include an optically clear adhesion film or an optical clear resin.

The display panel may further define a display surface curved with respect to a plane defined by a first direction and a second direction which crosses the first direction. In a line normal to the plane defined by the first and second directions, a distance between the first point at the upper surface of the first portion of the display panel and a first corresponding point at the upper surface of the window panel, may be different from a distance between the second point at the upper surface of the second portion of the display panel and a second corresponding point at the upper surface of the window panel.

In another exemplary embodiment of the invention, a display device includes a window panel which defines a single radius of curvature thereof, a display panel which displays an image, an upper surface of the display panel facing the window panel, and an adhesion layer which is between the window panel and the display panel and attaches the window panel to the display panel. The display panel defines a first portion thereof disposed at an axis about which the display panel is curved, the first portion having a first radius of curvature, and a second portion thereof extending from the first portion thereof, the second portion having a second radius of curvature greater than the first radius of curvature of the first portion.

In a plan view, the adhesion layer which attaches the window panel to the display panel may extend to overlap the first portion of the display panel and terminate at the second portion of the display panel.

In a plan view, the adhesion layer which attaches the window panel to the display panel may extend to overlap both the first and second portions of the display panel. A thickness of a portion of the adhesion layer which overlaps the first portion of the display panel may be greater than that of a portion of the adhesion layer which overlaps the second portion of the display panel.

In a line normal to the upper surface of the display panel, a first distance between a first point at the upper surface of the first portion of the display panel and a first crossing point at an upper surface of the window panel, may be different from a second distance between a second point at the upper surface of the second portion of the display panel and a second crossing point at the upper surface of the window panel.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
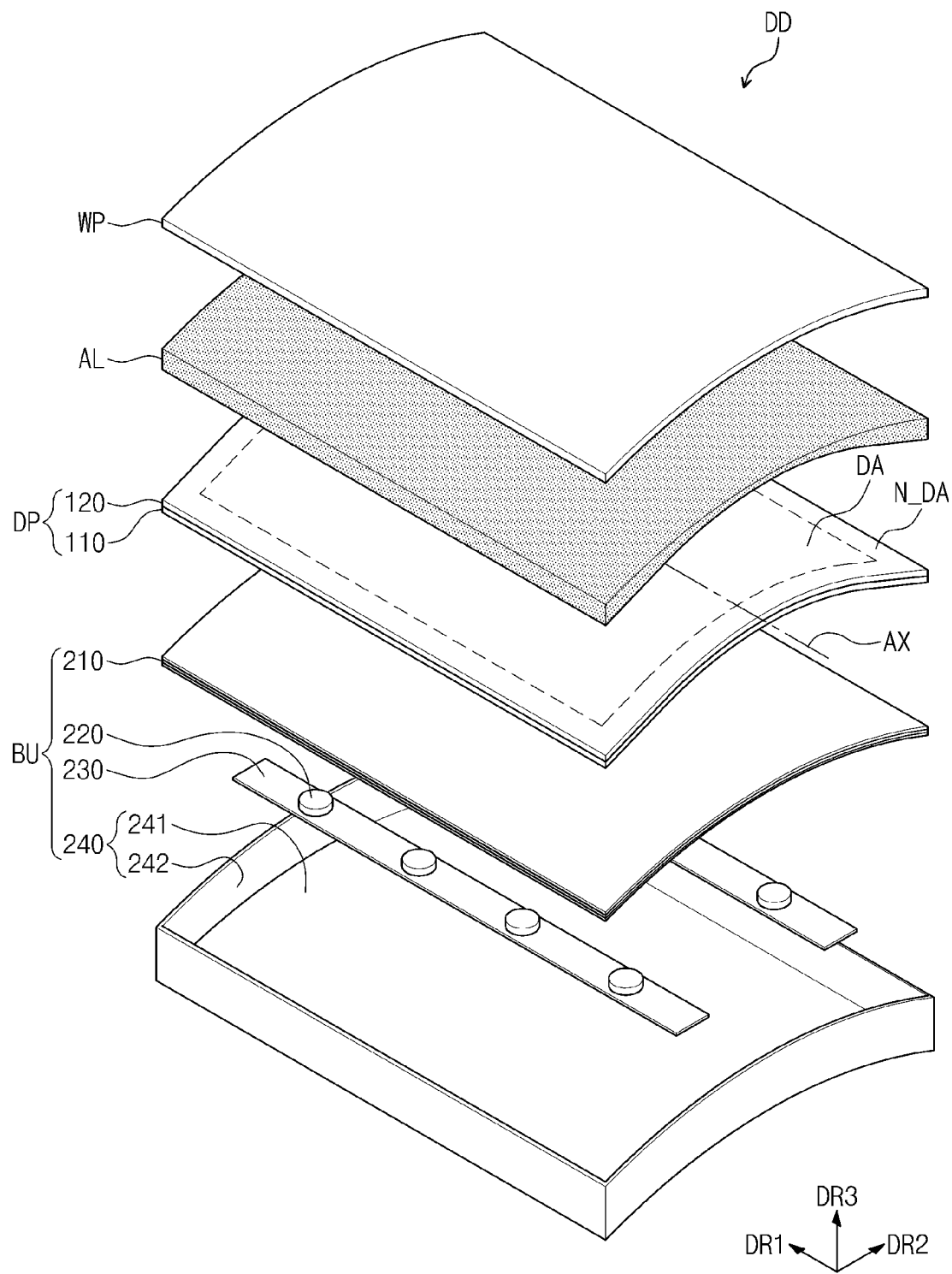
FIG. 1 is an exploded perspective view of an exemplary embodiment of a display device according to the invention.

Exemplary embodiments of the invention will be described below in more detail with reference to the accompanying drawings. The invention may, however, be embodied in different forms and should not be construed as limited to the exemplary embodiments set forth herein. Rather, the invention should be understood to be intended to include the structural and functional equivalents of the matter. In the following description of the invention, a detailed description of known functions and configurations incorporated herein will be omitted to avoid making the subject matter of the invention unclear and, in every possible case, like reference numerals are used for referring to the same or similar elements in the description and drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is an exploded perspective view of an exemplary embodiment of a display device according to the invention.

One or more exemplary embodiment of a display device DD according to the invention may be applied to various electronic devices such as a center information display ("CID") provided in a vehicle, wristwatch type electronic devices, a personal digital assistant ("PDA"), a portable multimedia player ("PMP"), a game machine, a tablet personal computer ("PC"), a smartphone, relatively large-sized electronic equipment including a television or an outdoor billboard, a PC, a laptop computer, a vehicle navigation unit, and small- and medium-sized electronic equipment including but not limited to a camera. Although these applications are merely suggested as an example of an electronic device in which the display device DD can be employed, the display device DD according to one or more exemplary embodiments may also be applied to other electronic devices without departing from the invention.

Referring to FIG. 1, the display device DD includes a display panel DP, a window panel WP, an adhesion layer AL and a backlight unit BU.

The display panel DP generates an image corresponding to image data inputted thereto. The display panel DP in the illustrated exemplary embodiment is not specifically limited, and may thus be any of a number of display panels such as a liquid crystal panel, a plasma display panel, an electrophoresis display panel and an electro-wetting display panel. In the illustrated exemplary embodiment, the display panel DP is a liquid crystal display panel.

The display panel DP may include a first display substrate 110, a second display substrate 120 facing the first display substrate 110, and a liquid crystal layer (not shown) disposed between the first display substrate 110 and the second display substrate 120. The liquid crystal layer may include a plurality of liquid crystal molecules of which orientations are changed according to an electric field formed between the first display substrate 110 and the second display substrate 120. Although not separately illustrated herein, a pair of polarizing plate (not shown) may be disposed over and under the display panel DP.

With respect to a reference axis AX parallel to a first direction DR1, the display panel DP has a display surface curved with respect to a plane defined by a second direction DR2 crossing the first direction DR1. The reference axis AX may be disposed at a center of the display device DD (or a center of the display pane DP) in the second direction DR2, but the invention is not limited thereto. In other words, the display panel DP may be bent in a convex shape along the second direction DR2. The display panel DP may have different curvature radii for each of a number of areas thereof. Detailed description for this will be given with reference to FIG. 2.

The display surface includes a display area DA, and a non-display area N_DA as a remaining portion of the display surface. The display area DA is an area in which an imaged is displayed, and the non-display area N_DA surrounds the display area DA and is an area in which the image is not displayed.

The display panel DP includes a sealant (not shown) disposed in the non-display area N_DA to couple the first display substrate 110 to the second display substrate 120. When the display panel DP is curved, compressive stress and tensile stress may be applied to the first display substrate 110 and the second display substrate 120, respectively.

In a comparative example different from the exemplary embodiment of the invention, when a display panel is curved with the same radius of curvature, shear deformation may not be generated on the sealant because the sealant has a relatively high modulus. Accordingly, buckling may occur on a portion of the first and second display substrates to cause a cell gap between the first display substrate and the second display substrate to decrease or increase. As a result, there is a phase difference in light passing through the display panel due to the different cell gaps, and light leakage phenomenon may be undesirably generated at a specific area of the display panel.

According to one or more exemplary embodiment of the invention, however, non-uniformity of the cell gap of the curved display panel DP may be minimized because the curved display panel DP has different radius of curvature for each of a number of areas thereof. As a result, according to one or more exemplary embodiment of the invention, a light leakage phenomenon caused by the phase difference in the curved display panel DP may be reduced. That is, since the light leakage phenomenon is reduced, an image having uniform luminance is viewable to a user even when viewing the display device DD in a relatively dark environment. In an exemplary embodiment, for example, when the display device DD of the invention is applied to a center information device provided in a vehicle, the light leakage phenomenon may not be seen even when a user drives the vehicle at night. According to one or more exemplary embodiment of the invention, deterioration in a display quality of the display device DD caused by the light leakage phenomenon may be reduced or effectively prevented.

The window panel WP is disposed over the display panel DP. Like the display panel DP, the window panel WP is convexly curved along the second direction DR2. The window panel WP has a first radius of curvature. Although the window panel WP may have a single radius of curvature, the invention is not limited thereto. In another exemplary embodiment, for example, when the display device DD is embedded in a vehicle dashboard, the window panel WP may have a plurality of radii of curvature corresponding to a curvature of the dashboard.

Although the window panel WP is not illustrated as formed by separate elements, the window panel WP may collectively include a base member and a black matrix. The base member may include at least one of a silicon substrate, a glass substrate, a sapphire substrate and a plastic film, but the invention is not limited thereto. The black matrix may be disposed on a rear surface (e.g., facing the display panel DP) of the base member to define a bezel area of the display device DD, that is, a non-display area of the display device DD. The non-display area of the display device DD may correspond to the non-display area N_DA of the display panel DP. The black matrix may be a colored organic layer and may be formed by a coating method, but the invention is not limited thereto.

Also, the window panel WP may further include a functional coating layer disposed on a front surface (e.g., at a viewing side of the display device DD) of the base member. The functional coating layer may include a fingerprint protection layer, a reflection protection layer, a hard coating layer, or the like. Also, the window panel WP may further include a touch sensor (not shown) detecting touch of the user.

The adhesion layer AL is disposed between the window panel WP and the display panel DP. The window panel WP and the display panel DP are bonded to each other by the adhesion layer AL. Although the adhesion layer AL is shaded in the figure, which is intended only for clarification, the adhesion layer AL may be a transparent member such as including a transparent material.

In the illustrated exemplary embodiment, an upper surface of the adhesion layer AL, which is attached to the window panel WP, has a shape corresponding to a radius of curvature of the window panel WP. A lower surface of the adhesion layer AL opposite to the upper surface, which is attached to the curved display panel DP, has a shape corresponding to a radii of curvature of the display panel DP. That is, since the curved display panel DP has different radii of curvature according to each of a number of areas thereof, a distance between the window panel WP and the curved display panel DP may be different. Accordingly, a cross-sectional thickness of the adhesion layer AL disposed between the window panel WP and the curved display panel DP may be non-uniform.

Even when the curved display panel DP having a plurality of radii of curvature is coupled to the window panel WP having a fixed (e.g., single) radius of curvature, a preset radius of curvature of the display panel DP may be maintained due to non-uniform thickness of the adhesion layer AL. Thicknesses of the adhesion layer AL are defined along lines normal to points along a surface of the display panel DP for convenience of description. Detailed description for this will be given with reference to FIG. 2.

The backlight unit BU includes optical sheets 210, light sources 220, a printed circuit substrate 230 and a bottom chassis 240.

The optical sheets 210 are disposed under the display panel DP. The optical sheets 210 enhance characteristics of light received from the light sources 220 to provide the received light to the display panel DP. The optical sheets 210 may include a diffusion sheet, a light collection sheet and a protection sheet, but the invention is not limited thereto. The diffusion sheet uniformly diffuses incident light. The light collection sheet collects light received from the diffusion sheet. The protection sheet protects the diffusion sheet and/or the light collection sheet from external elements.

The light sources 220 are disposed under the optical sheets 210. The light sources 220 generate and provide light to the optical sheets 210. The light sources 220 are mounted on the printed circuit substrate 230. The light sources 220 may receive a driving power from the printed circuit substrate 230. The light sources 220 mounted on a single printed circuit substrate 230 may collectively form a light source unit or module.

The bottom chassis 240 includes a bottom portion 241 and a sidewall portion 242 which extends from the bottom portion 241. The bottom portion 241 may be convexly curved along the second direction DR2. The light sources 220 and the printed circuit substrate 230 are disposed on the bottom portion 241. The illustrated exemplary embodiment shows a direct-type backlight unit BU, but the invention is not limited thereto. In another exemplary embodiment, when the backlight unit BU is an edge type backlight unit, the light sources 220 may be disposed at one side of the bottom chassis 240 and the backlight unit BU may further include a light guide plate.

Figure 2:
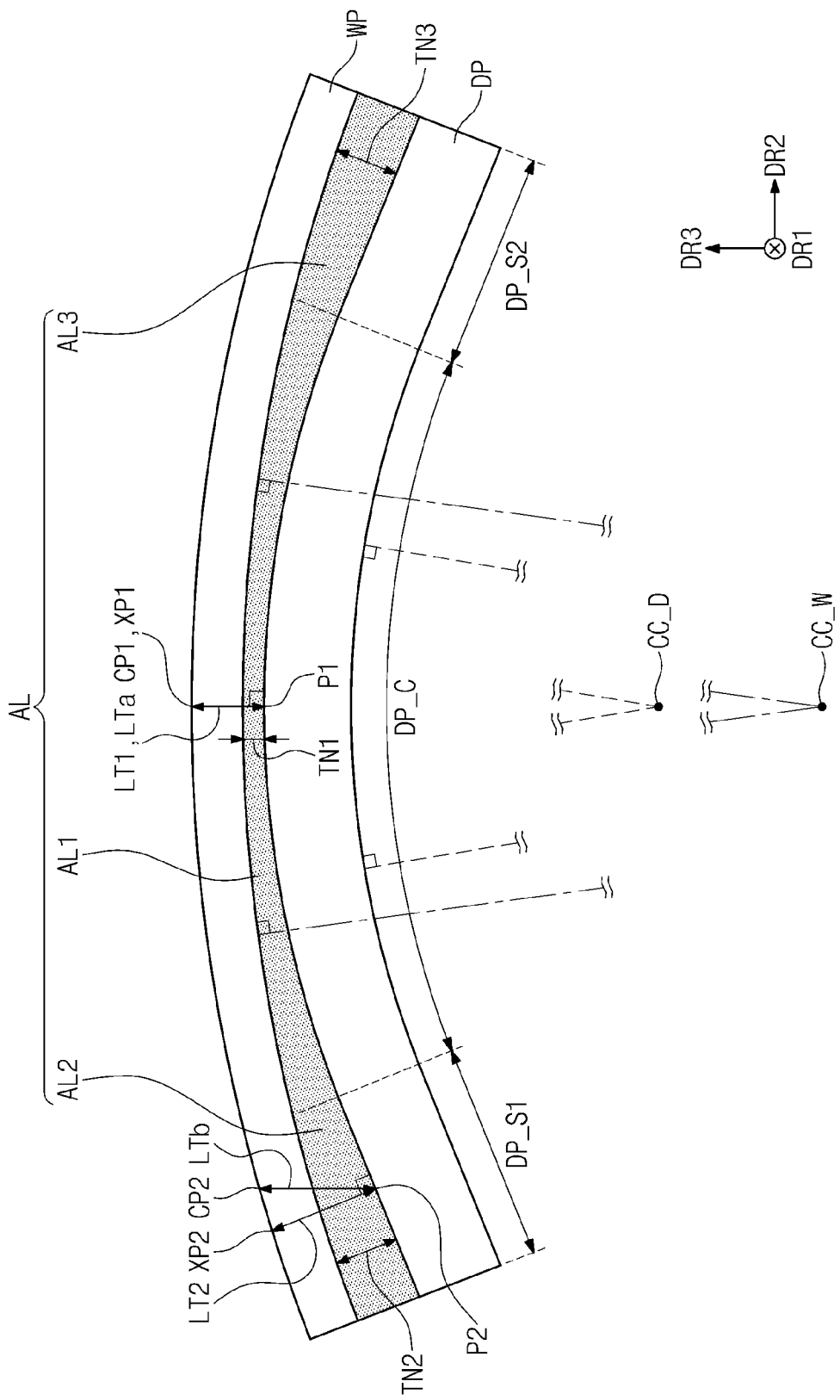
FIG. 2 is a cross-sectional side view of the display device of FIG. 1.

FIG. 2 is a cross-sectional side view of the display device of FIG. 1. The backlight unit (see BU in FIG. 1) is omitted in FIG. 2 for convenience of description.

Referring to FIGS. 1 and 2, the display panel DP includes a first portion DP_C, a second portion DP_S1 and a third portion DP_S2. The first portion DP_C is disposed between the second and third portions DP_S1 and DP_S2. The second portion DP_S1, the first portion DP_C and the third portion DP_S2 define the display surface including the display area DA and the non-display area N_DA and are sequentially disposed along a direction perpendicular to the first direction DR1, that is, the second direction DR2.

The first portion DP_C has a second radius of curvature, and the second and third portions DP_S1 and DP_S2 have a third radius of curvature greater than the second radius of curvature. In an exemplary embodiment, for example, the first radius of curvature of the window panel WP may be about 1000R (e.g., a bending degree of a circle having a radius of about 1000 millimeters (mm)), the second radius of curvature may be about 990R, and the third radius of curvature may be about 1100R or more. Although an approximate value is exemplarily provided herein, the invention is not limited thereto. Since each of the second and third portions DP_S1 and DP_S2 has a radius of curvature greater than that of the first portion DP_C, stress concentration on the second and third portions DP_S1 and DP_S2 may be reduced or effectively prevented. Accordingly, a degree in variation of a cell gap may be decreased.

Referring to the cross-sectional view of FIG. 2, a ratio of a length of each of the second portion DP_S1 and the third portion DP_S2, with respect to the sum of lengths of the first portion DP_C, the second portion DP_S1 and the third portion DP_S2 may be about 1% to about 35%. In more detail, the ratio of the length of each of the second portion DP_S1 and the third portion DP_S2 with respect to the sum of lengths of the first portion DP_C, the second portion DP_S1 and the third portion DP_S2 is about 10% to about 25%. However, the invention is not limited thereto, and the ratio of the length of each of the second portion DP_S1 and the third portion DP_S2 with respect to the sum of lengths of the first portion DP_C, the second portion DP_S1 and the third portion DP_S2 may be varied according to the size of the display area DA and the radius of curvature thereof. A respective length of the panel may be taken in the second direction DR2 at a center thickness of the respective panel.

The adhesion layer AL includes a first adhesion member AL1, a second adhesion member AL2 and a third adhesion member AL3. The first adhesion member AL1 is attached to the first portion DP_C, the second adhesion member AL2 is attached to the second portion DP_S1, and the third adhesion member AL3 is attached to the third portion DP_S2. The first adhesion member AL1, the second adhesion member AL2 and the third adhesion member AL3 are integrally formed with each other so as to form a single, unitary adhesion layer AL. In an exemplary embodiment, the first adhesion member AL1, the second adhesion member AL2 and the third adhesion member AL3 may each include or be formed of optical clear resin ("OCR").

The adhesion layer AL may be disposed between the window panel WP having the single first radius of curvature, and the display panel DP having the second and third radius of curvatures different from each other. The adhesion layer AL may have a non-uniform thickness by having a cross-sectional profile corresponding to the varying distance between the window panel WP and the display panel DP.

In the illustrated exemplary embodiment, the first adhesion member AL1 has a first thickness TN1 which is smaller than a second thickness TN2 of the second adhesion member AL2 and smaller than a third thickness TN3 of the third adhesion member AL3. From a second direction DR2 center of the first adhesion member AL1, the first thickness TN1 may increase in a direction towards each of the second adhesion member AL2 and the third adhesion member AL3. Also, from distal ends of the first adhesion member AL1, the second thickness TN2 and the third thickness TN3 may respectively increase in the second direction DR2 toward distal ends of the second and third adhesion member AL2 and AL3. Among thicknesses TN1, TN2 and TN3 of the adhesion member, a maximum thickness TN1 is smaller than or equal to a minimum thickness TN2 and a minimum thickness TN3.

Each of the second thickness TN2 and the third thickness TN3 may be about 105% to about 130% greater than a minimum thickness of the first thickness TN1, the invention is not limited thereto. In an exemplary embodiment, for example, each of the second thickness TN2 and the third thickness TN3 may be varied along the second direction DR2 according to a difference between curvature radii of the display panel DP and the window panel WP along the second direction DR2. For points along the upper surface of the adhesion layer AL, along a line normal to the various upper surface points, a thickness of the adhesion layer AL may be defined as a distance from a lower surface point thereof at which is attached the display panel to an upper surface point thereof at which is attached the window panel. For illustration purposes only, two such thicknesses are illustrated in the first portion DP_C of FIG. 2. Although the thickness of the adhesion member AL is exaggerated for clarification in figures, a maximum thickness of the adhesion layer AL may be smaller than that of the window panel WP.

Since the thicknesses of the adhesion layer AL are different along the second direction DR2, the display panel DP may not be deformed to a shape corresponding to a curvature of the window panel WP even when the display panel DP is coupled to the window panel WP. Accordingly, each of the second and third portions DP_S1 and DP_S2 of the display panel DP is maintained to have a radius of curvature greater than that of the first portion DP_C thereof. Accordingly, stress applied to the second portion DP_S1 and the third portion DP_S2 may be reduced. As a result, a display defect such as light leakage phenomenon may be minimized.

Distances between the display panel DP and an upper surface of the window panel WP may be maintained differently for various point thereof along the second direction DR2. In an exemplary embodiment, for example, a distance between a first point P1 at an upper surface of the first portion DP_C and a first corresponding point CP1 at an upper surface of the window panel WP, which is overlapped with the first point P1 in a plan view, is defined as a first distance LTa, and a distance between a second point P2 at an upper surface of the second portion DP_S1 and a second corresponding point CP2 at an upper surface of the window panel WP, which is overlapped with the second point P2 in the plan view, is defined as a second distance LTb. In this case, the first distance LTa may differ from second distance LTb. A point overlapped in the plan view represents a point overlapped when the display device DD is viewed from a third direction DR3. The distances in the plan view of the display device DD are taken along a line normal to the plane defined by the first and second direction DR1 and DR2.

FIG. 2 illustrates that a second radius of curvature of the first portion DP_C is less than a first radius of curvature of the window panel WP and the second radius of curvature of the first portion DP_C is less than a third radius of curvature of the second and third portions DP_S1 and DP_S2. Here, the first distance LTa at the first portion DP_C may be gradually increased along the second direction DR2 from a center of the display panel DP toward the second and third portions DP_S1 and DP_S2. Accordingly, since the second radius of curvature of the first portion DP_C is less than a third radius of curvature of the second and third portions DP_S1 and DP_S2 each first distance LTa may be less than each second distance LTb at the second and third portions DP_S1 and DP_S2. In an exemplary embodiment, even if the first radius of curvature of the window panel WP and the second radius of curvature of the first portion DP_C are same, first distances LTa at the first portion DP_C and second distances LTb at the second and third portions DP_S1 and DP_S2 may be different because within the display panel DP, the third radius of curvature of the second and third portions DP_S1 and DP_S2 is greater than the second radius of curvature of the first portion DP_C.

Along lines normal to the upper surface of the display panel DP, corresponding crossing points along the upper surface of the window panel WP are defined. Along a line normal to the first point P1, a distance between the first point P1 at the upper surface of the display panel DP and a first crossing point XP1 at the upper surface of the window panel WP, is defined as a first crossing distance LT1. Along a line normal to the second point P2, a distance between the second point P2 at the upper surface of the display panel DP and a second crossing point XP2 at the upper surface of the window panel WP, is defined as a second crossing distance LT2.

From FIG. 2, since a first curvature center CC_W of the first radius of curvature of the window panel WP and a second curvature center CC_D of the second radius of curvature of the first portion DP_C are different, the first crossing distance LT1 may be gradually increased along the second direction DR2 from a center of the display panel DP toward the second and third portions DP_S1 and DP_S2. Since the second portion DP_S1 and the third portion DP_S2 have the third radius of curvature greater than the second radius of curvature of the first portion DP_C, the second crossing distance LT2 may be greater than the first crossing distance LT1. In an exemplary embodiment, even if a first curvature center CC_W of the first radius of curvature of the window panel WP and a second curvature center CC_D of the second radius of curvature of the first portion DP_C are the same, first crossing distances LTa and second crossing distances LTb may be different from each other because the third radius of curvature of the second portion DP_S1 and the third portion DP_S2 is greater than the second radius of curvature of the first portion DP_C.

According to the illustrated exemplary embodiment, a cross-sectional thickness of the adhesion layer AL may be adjusted according to a curvature of the display panel DP. Accordingly, although the curvature of the display panel DP is varied along the curved direction, the display panel DP having various curvatures may be attached to the window panel WP having a single curvature.

FIG. 2 illustrates the first curvature center CC_W of the first radius of curvature of the window panel WP and the second curvature center CC_D of the second radius of curvature of the first portion DP_C. Each of the first curvature center CC_W and the second curvature center CC_D is defined at a position under the display panel DP since the display device DD is convexly curved upwardly, e.g., towards the viewing side thereof. A user would view an image of the display device DD illustrated in FIG. 2 through a convex area because the display panel DP provides the image in an upward direction in the exemplary embodiment of FIG. 2, the invention is not limited thereto. In another exemplary embodiment, for example, each of the first curvature center CC_W and the second curvature center CC_D may be disposed at a position above the window panel WP, that is, at a viewing side of the display device DD. Where the display device DD is concavely curved downwardly, e.g., away from the viewing side thereof, the user would view the image through a concave area because the display panel DP provides the image in an upward direction.

Figure 3:
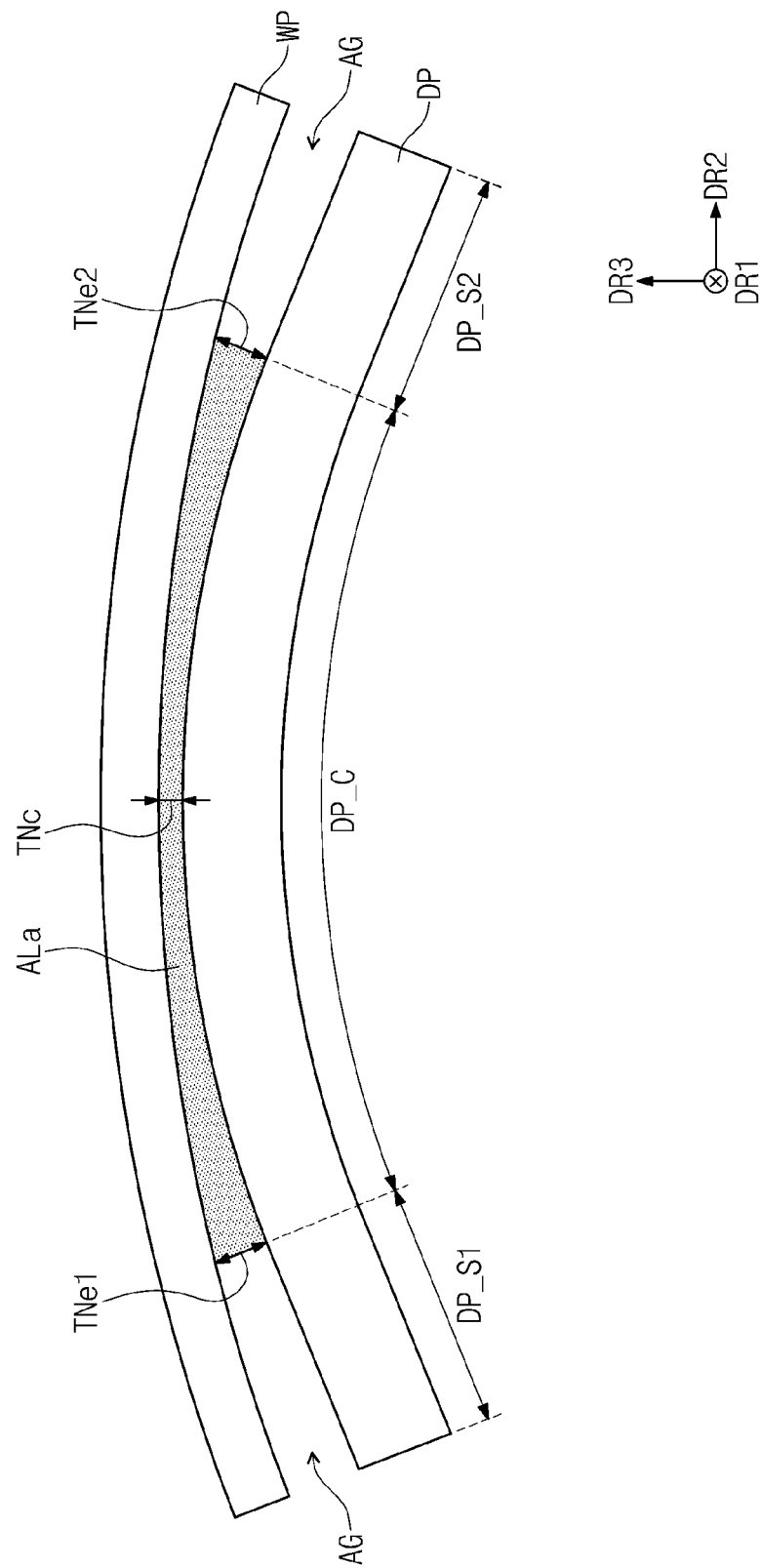
FIG. 3 is a cross-sectional side view of another exemplary embodiment of a display device according to the invention.

FIG. 3 is a cross-sectional side view of another exemplary embodiment of a display device according to the invention. The display device illustrated in FIG. 3 differs from the display device described with reference to FIG. 2 in adhesion layer ALa.

The adhesion layer ALa is attached to the first portion DP_C. In the plan view, the adhesion layer ALa is overlapped with the first portion DP_C and is not overlapped with the second and third portions DP_S1 and DP_S2. The adhesion layer ALa may include or be made of optical resin. A portion of the adhesion layer ALa overlapped with the first portion DP_C terminates at the second and third portions DP_S1 and DP_S2 such that the adhesion layer ALa does not overlap the second and third portions DP_S1 and DP_S2.

The second radius of curvature of the first portion DP_C may be less than the first radius of curvature of the window panel WP. Accordingly, a thickness of the adhesion layer ALa is gradually increased in the second direction DR2 from a center of the adhesion layer ALa toward each of the second and third portions DP_S1 and DP_S2. That is, a first thickness TNc of the center of the adhesion layer ALa may be less than a second thickness TNe1 of a first end of the adhesion layer ALa adjacent to the second portion DP_S1 and less than a third thickness TNe2 of an opposing second end of the adhesion layer ALa adjacent to the third portion DP_S2.

An air gap AG may be defined between the second portion DP_S1 and the window panel WP and between the third portion DP_S2 and the window panel WP. The air gap AG extends from edges of the display panel DP to a location at which the adhesion layer ALa terminates. Although, after the display panel DP and the window panel WP are coupled to each other and the first portion DP_C is attached to the adhesion layer ALa to maintain the second radius of curvature of the first portion DP_C, since the adhesion layer ALa is absent at the air gap AG, the second portion DP_S1 and the third portion DP_S2 may be restored to a flat state (e.g., closer to the plane defined by first and second directions DR1 and DR2), but the invention is not limited thereto. In another exemplary embodiment, for example, the second portion DP_S1 and the third portion DP_S2 may be deformed to have the third radius of curvature greater than the second radius of curvature such that even where the adhesion layer ALa is absent at the air gap AG, the second portion DP_S1 and the third portion DP_S2 may remain in a curved state thereof. Accordingly, where the second portion DP_S1 and the third portion DP_S2 may remain in a curved state thereof, variation in a cell gap may be reduced such that stress concentration on the second and third portions DP_S1 and DP_S2 may be reduced or effectively prevented. Accordingly, a display defect such as light leakage phenomenon may be minimized.

Figure 4:
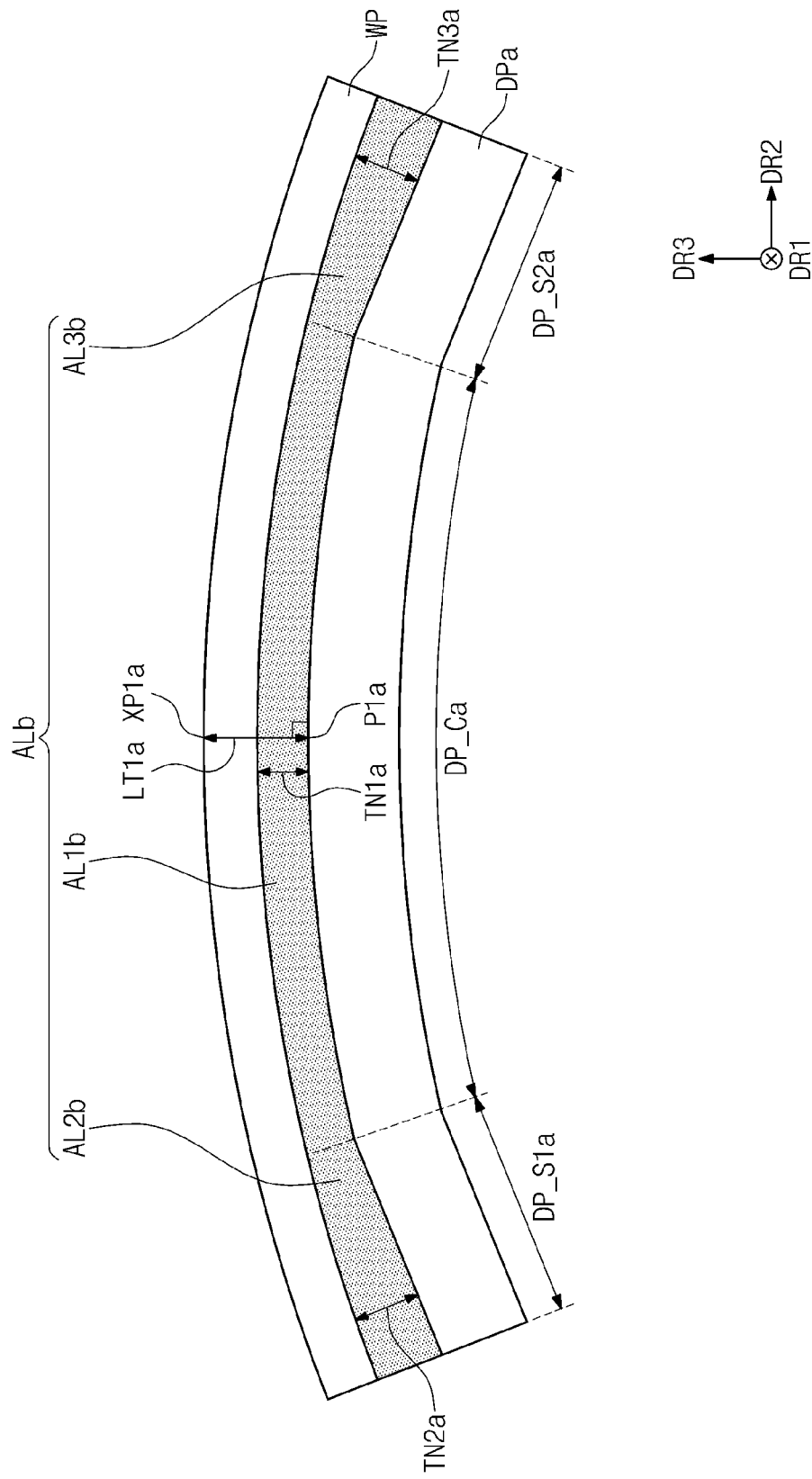
FIG. 4 is a cross-sectional side view of still another exemplary embodiment of a display device according to the invention.

FIG. 4 is a cross-sectional side view of still another exemplary embodiment of a display device according to the invention. The display device illustrated in FIG. 4 differs from the display device described with reference to FIG. 2 in display panel DPa and adhesion layer ALb.

The display panel DPa includes a first portion DP_Ca, a second portion DP_S1a, and a third portion DP_S2a. The first portion DP_Ca may be curved to be being disposed parallel with the window panel WP. For example, a difference between a second radius of curvature of the first portion DP_Ca and a first radius of curvature of the window panel WP may be equal to a distance between upper surfaces of the window panel WP and the first portion DP_Ca. Accordingly, the first radius of curvature and the second radius of curvature may have the same curvature center.

In a line normal to the upper surface of the display panel DPa, a crossing distance LT1a between a first point P1a at the upper surface of the first portion DP_Ca and a first crossing point XP1a at the upper surface of the window panel WP, may be uniform along an entirety of the second direction DR2 since the first portion DP_Ca is curved to be being disposed parallel with a corresponding portion of the window panel WP. Each of the second portion DP_S1a and the third portion DP_S2a may have a third radius of curvature greater than the second radius of curvature of the first portion DP_Ca or each of the second portion DP_S1a and the third portion DP_S2a may have a third radius to be disposed in a flat state, (e.g., substantially parallel to the plane defined in the first and second directions DR1 and DR2). For the flat state, the third radius of curvature may be infinite.

The adhesion layer ALb includes a first adhesion member AL1b, a second adhesion member AL2b and a third adhesion member AL3b. The first adhesion member AL1b is attached to the first portion DP_Ca, the second adhesion member AL2b is attached to the second portion DP_S1a, and the third adhesion member AL3b is attached to the third portion DP_S2a. The first adhesion member AL1b has a first thickness TN1a smaller than a second thickness TN2a of the second adhesion member AL2b and smaller than a third thickness TN3a of the third adhesion member AL3b. In the illustrated exemplary embodiment, the first thickness TN1a may be substantially uniform across an entirety of the first adhesion member AL1b along the second direction DR2 since the first portion DP_Ca is curved to be being disposed parallel with a corresponding portion of the window panel WP.

Also, each of the second thickness TN2a and the third thickness TN3a may become greater along the second direction DR2 from opposing distal ends of the first adhesion member AL1b toward the second and third adhesion member AL2b and AL3b. The adhesion layer ALb may include or be made of an optical resin.

Figure 5:
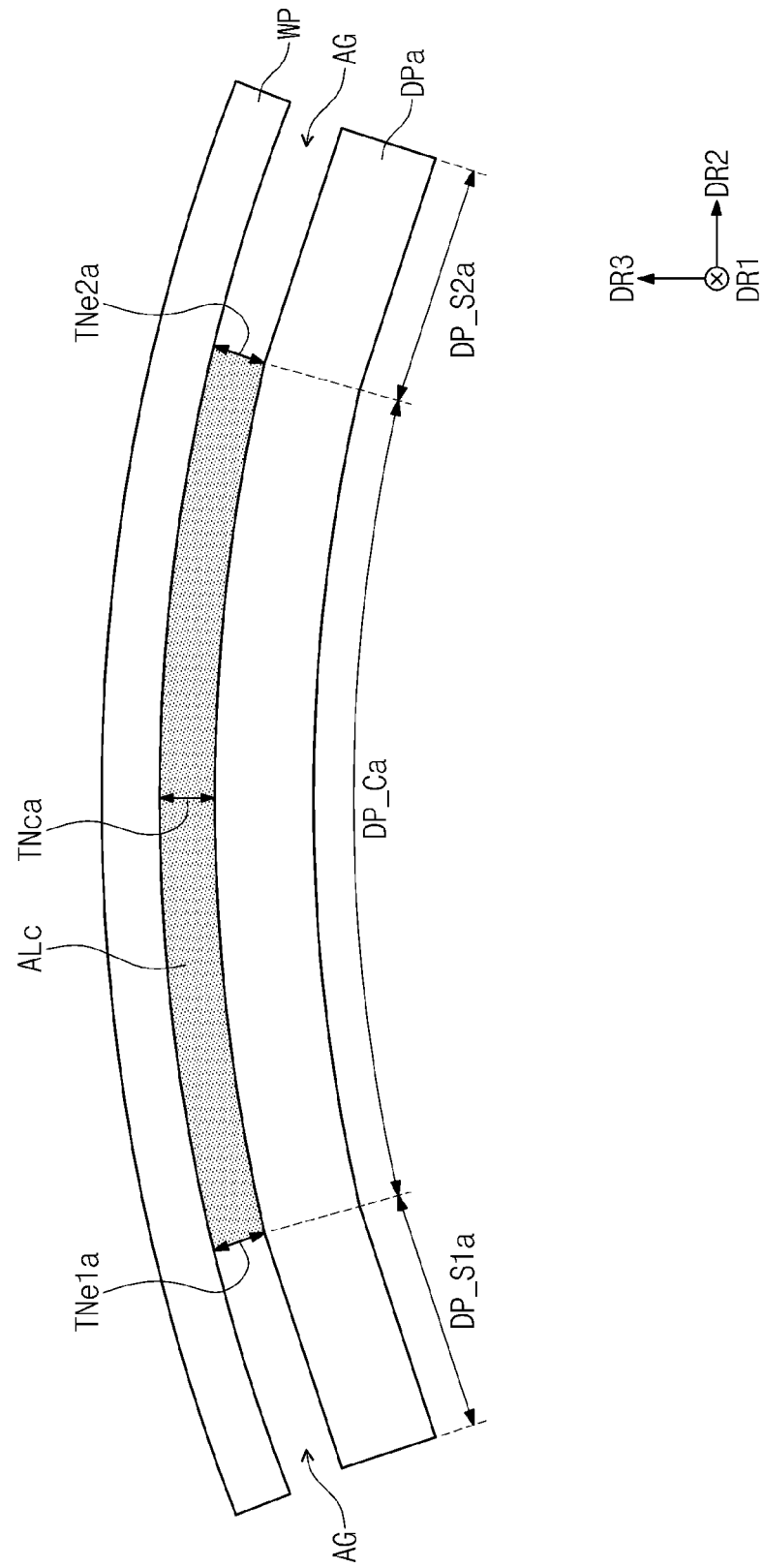
FIG. 5 is a cross-sectional side view of a yet another exemplary embodiment of a display device according to the invention.

FIG. 5 is a cross-sectional side view of yet another exemplary embodiment of a display device according to the invention. The display device illustrated in FIG. 5 differs from the display device described with reference to FIG. 4 in adhesion layer ALc.

The adhesion layer ALc is attached to the first portion DP_Ca. In the plan view, the adhesion layer ALc is overlapped with the first portion DP_Ca and is not overlapped with the second and third portions DP_S1a and DP_S2a. A portion of the adhesion layer ALc overlapped with the first portion DP_Ca terminates at the second and third portions DP_S1a and DP_S2a such that the adhesion layer ALc does not overlap the second and third portions DP_S1 and DP_S2. In the illustrated exemplary embodiment, a thickness of the adhesion layer ALc may be substantially same since the first portion DP_Ca overlapped by the adhesion layer ALc is curved to be being disposed parallel with a corresponding portion of the window panel WP. For example, a first thickness TNca of the center of the adhesion layer ALc may be substantially the same as a second thickness TNe1a of a first end of the adhesion layer ALc adjacent to the second portion DP_S1a and substantially the same as a third thickness TNe2a of an opposing second other end of the adhesion layer ALc adjacent to the third portion DP_S2a. The adhesion layer ALc may be made of an optical resin or an optically clear adhesive film.

An air gap AG may be defined between the second portion DP_S1a and the window panel WP and between the third portion DP_S2a and the window panel WP. The air gap AG extends from edges of the display panel DPa to a location at which the adhesion layer ALc terminates.

In one or more exemplary embodiment of a display device according to the invention, the stress applied to opposing ends of the curved display panel may be relieved by the adhesion layer disposed between the window panel and the curved display panel. Therefore, the phenomenon in which the image is seen too bright or dark at the opposing ends of the curved display panel may be reduced.

The invention is not limited to the exemplary embodiments described above but is defined by the appended claims. It is evident, however, that many alternative modifications and variations will be apparent to those having skill in the art in light of the foregoing description. Therefore, such an exemplary modification or exemplary corrections will be included to the scope of the claim of the invention.

What is claimed is:

1. A display device, comprising:
a window panel having a first radius of curvature;
a display panel which displays an image, an upper surface of the display panel facing the window panel, the display panel defining:
a first portion thereof disposed at an axis about which the display panel is curved, the first portion having a second radius of curvature, and
a second portion thereof extending from a first end of the first portion, the second portion having a third radius of curvature different from the second radius of curvature; and
an adhesion layer which is disposed between the window panel and the curved display panel and bonds the window panel to the display panel,
wherein the window panel and the display panel are each curved in a same direction with respect to a viewing side of the display device, such that in a line normal to the upper surface of the display panel, a first distance between a first point at the upper surface of the first portion of the display panel and a first crossing point at an upper surface of the window panel, is different from a second distance between a second point at the upper surface of the second portion of the display panel and a second crossing point at the upper surface of the window panel.

2. The display device of claim 1, wherein
the display panel further defines a third portion thereof extending from a second end of the first portion opposing the first end thereof, and
the third portion of the display panel is curved to have a radius of curvature greater than the second radius of curvature of the first portion of the display panel or the third portion of the display panel has an infinite radius of curvature such that the third portion is substantially flat.

3. The display device of claim 2, wherein
the display panel further defines a display surface curved with respect to a plane defined by a first direction and a second direction which crosses the first direction,
the second portion, the first portion, and the third portion define the display surface and are sequentially disposed along a direction perpendicular to the first direction.

4. The display device of claim 1, wherein among the display panel defining the first and second portions and the window panel having the first radius of curvature,
the window panel defines a curvature center thereof and the display panel defines a curvature center thereof, and
in a cross-sectional direction, the display panel is disposed between the window panel and each of the curvature centers of the window panel and the display panel.

5. The display device of claim 1, wherein
the adhesion layer defines:
a first adhesion member thereof attached to the first portion of the display panel; and
a second adhesion member thereof attached to the second portion of the display panel,
wherein a minimum thickness of the second adhesion member is equal to or greater than a maximum thickness of the first adhesion member, and
the second distance is greater than the first distance.

6. The display device of claim 5, wherein a thickness of the second adhesion member attached to the second portion of the display panel increases from the first end of the first portion of the display panel to a distal end of the second portion of the display panel.

7. The display device of claim 5, wherein a thickness of the first adhesion member attached to the first portion of the display panel is substantially uniform.

8. The display device of claim 5, wherein a thickness of the first adhesion member attached to the first portion of the display panel increases from a center portion thereof to the second adhesion member.

9. The display device of claim 1, wherein in a plan view, the adhesion layer attached to the first portion of the display panel extends to overlap the first portion and terminates at the second portion of the display panel.

10. The display device of claim 9, wherein a thickness of the adhesion layer which overlaps the first portion of the display panel and terminates at the second portion of the display panel is substantially uniform.

11. The display device of claim 9, wherein a thickness of the adhesion layer which overlaps the first portion of the display panel and terminates at the second portion of the display panel increases from a center of the adhesion layer to a terminating end thereof.

12. The display device of claim 1, wherein the third radius of curvature of the second portion of the display panel is greater than the second radius of curvature of the first portion of the display panel.

13. The display device of claim 1, wherein the third radius of curvature of the second portion of the display panel is infinite such that the second portion is substantially flat.

14. The display device of claim 1, wherein the second radius of curvature of the first portion of the display panel is equal to or less than the first radius of curvature of the window panel.

15. The display device of claim 1, wherein the adhesion layer comprises an optically clear adhesion film or an optical clear resin.

16. The display device of claim 1, wherein
the display panel further defines a display surface curved with respect to a plane defined by a first direction and a second direction which crosses the first direction, and
in a line normal to the plane defined by the first and second directions, a distance between the first point at the upper surface of the first portion of the display panel and a first corresponding point at the upper surface of the window panel, is different from a distance between the second point at the upper surface of the second portion of the display panel and a second corresponding point at the upper surface of the window panel.

17. A display device, comprising:
a window panel which defines a single radius of curvature thereof;
a display panel which displays an image, an upper surface of the display panel facing the window panel; and
an adhesion layer which is between the window panel and the display panel and attaches the window panel to the display panel,
wherein the window panel and the display panel are each curved in a same direction with respect to a viewing side of the display device, such that the display panel defines:
  a first portion thereof disposed at an axis about which the display panel is curved, the first portion having a first radius of curvature; and
  a second portion thereof extending from the first portion thereof, the second portion having a second radius of curvature greater than the first radius of curvature of the first portion.

18. The display device of claim 17, wherein in a plan view, the adhesion layer which attaches the window panel to the display panel extends to overlap the first portion of the display panel and terminates at the second portion of the display panel.

19. The display device of claim 17, wherein
in a plan view, the adhesion layer which attaches the window panel to the display panel extends to overlap both the first and second portions of the display panel, and
a thickness of a portion of the adhesion layer which overlaps the first portion of the display panel is greater than that of a portion of the adhesion layer which overlaps the second portion of the display panel.

20. The display device of claim 17, wherein in a line normal to the upper surface of the display panel, a first distance between a first point at the upper surface of the first portion of the display panel and a first crossing point at an upper surface of the window panel, is different from a second distance between a second point at the upper surface of the second portion of the display panel and a second crossing point at the upper surface of the window panel.

* * * * *